F. A. FORSBERG.
AUTO SIGNAL.
APPLICATION FILED DEC. 2, 1920.

1,430,972.

Patented Oct. 3, 1922.
2 SHEETS—SHEET 1.

Witnesses:
W. J. Kilroy
Harry R. L. White

Inventor:
Fred A. Forsberg
By Kent W. Trownell
Atty.

F. A. FORSBERG.
AUTO SIGNAL.
APPLICATION FILED DEC. 2, 1920.
1,430,972.
Patented Oct. 3, 1922.
2 SHEETS—SHEET 2.
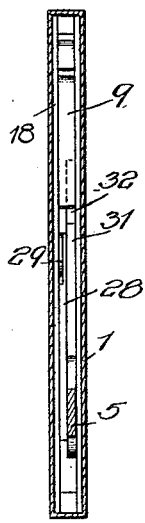
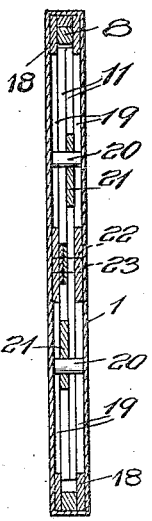
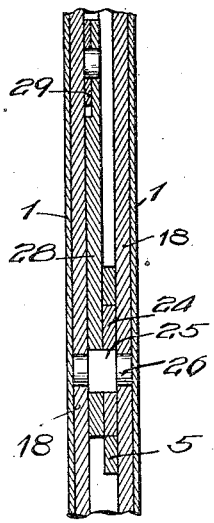
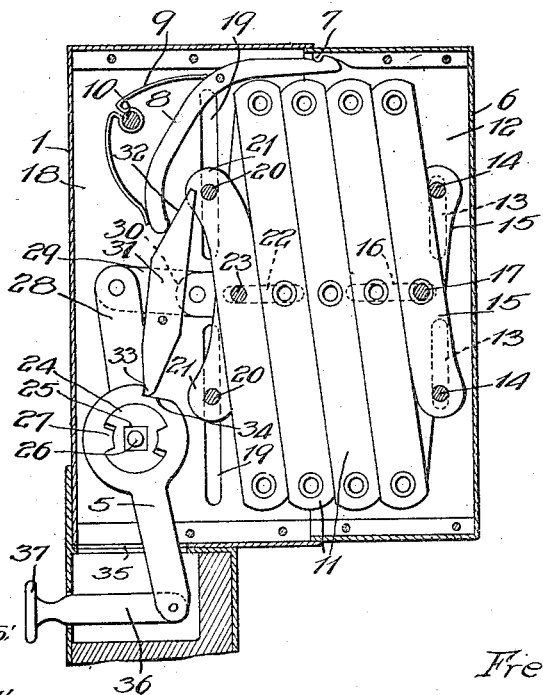
Inventor:
Fred A. Forsberg Patented Oct. 3, 1922.

1,430,972

UNITED STATES PATENT OFFICE.

FRED A. FORSBERG, OF ROCKFORD, ILLINOIS.

AUTO SIGNAL.

Application filed December 2, 1920. Serial No. 427,693.

*To all whom it may concern:*

Be it known that I, FRED A. FORSBERG, a citizen of the United States, residing at Rockford, in the county of Winnebago and State of Illinois, have invented certain new and useful Improvements in Auto Signals, of which the following is a specification.

This invention relates particularly to a signal device for automobiles although, of course, it may be used wherever applicable. The principal object of the invention is to provide a new and improved signalling device of this kind which can be easily operated by a person within the automobile and can be extended more easily and to a greater distance than the hand or arm of a person, thereby being more effective as a warning signal. Another object of the invention is to provide means for locking the device in closed position so that it can be extended only when positively operated, and will be held in place without rattling when not in use as a signal. Other objects will appear hereinafter. The invention consists in the novel construction, combination and arrangement of the several parts.

Figure 1:
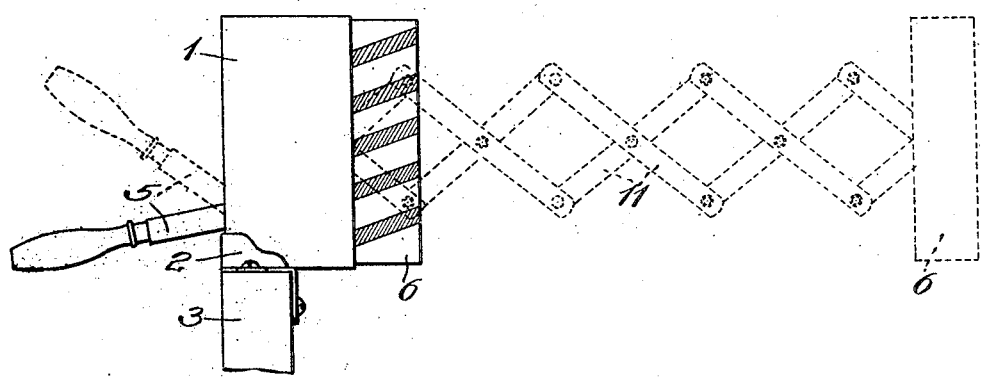
Figure 2:
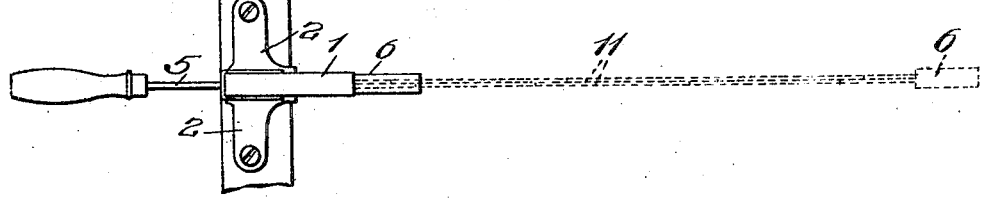
Figure 3:
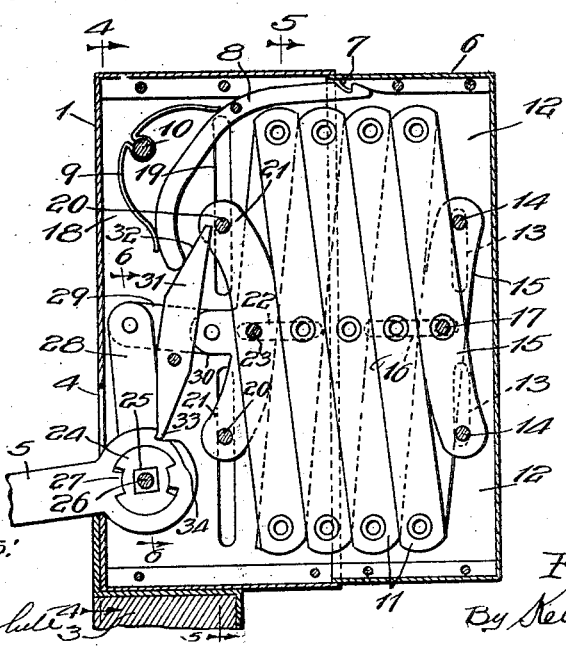

In the accompanying drawings, Fig. 1 is a view of a signalling device constructed in accordance with the principles of this invention showing the signalling member in extended position; Fig. 2 is a top view; Fig. 3 is a sectional view showing the operating parts; Fig. 4 is a sectional detail taken on the line 4—4 of Fig. 3; Fig. 5 is a section taken on the line 5—5 of Fig. 3; Fig. 6 is a detail section taken on the line 6—6 of Fig. 3; and Fig. 7 is a view similar to Fig. 3 showing a modified form of operating member.

This invention is designed and intended to be secured to the door or frame of an automobile closely adjacent the driver so that the operating member or handle is closely adjacent the steering wheel where it can be grasped and operated with the least possible trouble, and in fact, without looking away from the road ahead or withdrawing the attention of the driver from his steering or operating position.

In carrying out this invention, a frame or holder 1 attached in any suitable way to a bracket 2 is carried by a support 3 which may be the frame of an automobile to which the device is applied, or the door, or any other suitable supporting part.

This holder 1 is preferably made of metal in the form of a hollow shell open at the front and having a slot 4 at the rear through which an operating arm 5 extends.

A signalling member 6 also preferably made of sheet metal is adapted to fit into the open edge of the holder 1, so that it will slip readily thereinto, and at one end it is provided with a fixed hook or catch 7 which is adapted to be engaged by a latch 8 pivoted within the holder 1, and having a spring 9 mounted upon a shaft 10 for engaging the free end of the latch and tending to press it into engagement with the catch 7.

The holder and the signalling member 6 are connected by means of a lazy tongs construction 11 which is adapted to be contained within them when the signalling member is in its retracted position, and in order to connect the signalling member with this lazy tongs, a plate or a pair of plates 12 are secured in the signalling member 6 on each side of the lazy tongs, having vertical slots 13 adapted to be engaged by pins 14 carried by end members 15 of the lazy tongs, and each having a horizontal slot 16 engaged by a pivoting pin 17 which connects the two end members 15. A similar construction is provided for mounting the inner end of the lazy tongs in the holder 1, and comprises plates 18 with vertical slots 19 for engaging the pins 20 of end members 21, and a horizontal slot 22 for engaging the pivoting pin 23 which connects the end members 21 at this end. It is obvious that when the signalling member 6 is moved outwardly, the lazy tongs will be extended because of the pin and slot connections at the ends, and the signalling member will be held in an upright position the same as when it engages within the holder 1.

In order to mechanically extend the lazy tongs and to project the signalling member, the operating arm 5 is mounted upon a notched member 24 which in turn is fixed upon the squared portion 25 of a bearing pin 26. The operating arm has notches 27 which engage the notches of the member 24 but have a loose motion connection therewith so that the arm 5 can be moved a short distance before engaging the member 24. Also mounted upon the squared portion 25 of the bearing pin 26 is an arm 28 which is connected by means of a link 29 with a projection 30 from one of the end members 21 of the lazy tongs.

Also pivoted within the holder 1 is a cam member or operating lever 31, one end of which has a surface 32 for engaging the extremity of the latch 8, while the other extremity 33 is adapted to engage in a notch 34 of the operating arm 5. When the arm is turned, the operating lever 31 is pressed against the catch 8 disengaging the latch extremity from the hook 7.

Instead of having the arm 5 extend through the inner side of the holder 1, it may extend through a bottom opening 35, as shown more clearly in Fig. 7. In this case an operating link 36 is provided with a knob 37 which can be pushed or pulled to operate the device. This construction may be utilized for example in the closed type of automobiles so that all that would be visible from the inside of the car would be the operating knob 37 and the end of the member 36.

In operation it is necessary only to move the operating lever 5 in the proper direction, in which case the lever 31 is first actuated to release the spring pressed latch 8, after which the continued movement of the arm 5 in the same direction will take up the lost motion between it and the notched member 24 whereupon the lazy tongs will be projected and the signal member 6 will be extended in the manner described. In withdrawing the signalling member the action is reversed, and as soon as the edge of the signalling member is withdrawn within the holder 1, the catch 7 is engaged by the spring pressed latch 8 and the signalling member is held in position until it is again operated.

I claim:

1. In a signalling device of the class described, a holder, a signalling member, means for extending the signalling member from the holder, a lock for directly engaging and securing the member in the holder, and operating means for first releasing the lock and then projecting the member with the extending means.

2. In a signalling device of the class described, a holder, an extensible signalling member, a lock in connection with the holder for engaging the member, means for first releasing the lock and then extending the signalling member.

3. In a signal of the class described, a holder, an extensible signalling member, means for directly engaging the member in the holder, and an operating device for first releasing the engaging means and then projecting the member.

4. In a signal of the class described, an extensible signalling member, locking means for engaging and holding the member in retracted position, and operating means having a loose motion connection for first disengaging the locking means and then extending the signalling member.

5. In a signalling device, an easily visible signalling member, a lazy tongs extending means for the signalling member, a locking lever for engaging and holding the member in retracted position, and an operating member together with means comprising a loose motion connection and means for first disengaging the locking lever and then extending the lazy tongs to project the signalling member.

6. In a signal of the class described, a signalling member and means for projecting it from its normal retracted position, a holder into which the member extends with a lock for directly engaging and retaining it in retracted position, and a reversible operating lever having a loose motion connection for first releasing the lock and then projecting the member from the holder.

7. In a signal of the class described, a holder and a movable signalling member, a lazy tongs construction connection to the holder and member for extending the latter, a latch pivoted in the holder for engaging the member when it is drawn back, and a pivoted arm extending from the holder having a lost motion connection for first releasing the latch and then operating the lazy tongs in the holder and manually movable in opposite directions for extending and withdrawing the member by its movement.

8. In a signal of the class described, a holder, and a movable signalling member, a lazy tongs construction connecting them and including a plate at each end of the lazy tongs with horizontal and vertical slots engaged by pins at the ends of the lazy tongs, and manually operable means in the holder movable in reverse directions for extending and retracting the lazy tongs.

9. In a signal of the class described, a movable signalling member, means for extending and retracting the member, a spring pressed latch for engaging the member in its retracted position, reversible operating means for the extending and retracting means, and a lever engaged by the operating means for disengaging the spring pressed latch before the operation of the extending means.

10. In a signalling device of the class described, a signalling member and means for extending and retracting it, a spring pressed latch for directly engaging the member in its retracted position, manually reversible operating means for the extending and retracting means comprising an operating arm, a member upon which the arm is mounted having a lost motion connection therewith, means in connection with this member for moving the extending and retracting means, and a lever operated by the arm for releasing the latch before the lost motion is taken up in the operation of the arm.

11. In a signaling device of the class described, a hollow holder and a hollow signalling member, a pair of plates in each of them having a horizontal and vertical slots, a lazy tongs construction connecting the holder and member with supporting pins at the ends engaging in the slots; the lazy tongs construction being entirely contained within the member and holder when the member is retracted, and reversible means for operating the lazy tongs to extend and retract the signalling member.

12. In an auto signal of the class described, a hollow flat holder open at the outer edge, a hollow signalling member adapted to fit in the open edge of the holder, extensible means for projecting and withdrawing the member, a spring pressed latch engaging the member within the holder, an operating arm and a member upon which it is mounted with a lost motion connection between them, a lever pivoted in the holder and engaged by the arm for operating the spring pressed latch to disengage it from the signalling member before the lost motion is taken up, and a connection from the member upon which the arm is mounted to operate the extensible means after the latch is disengaged, all of the parts above mentioned being contained within the holder and the member except the end of the operating arm which projects from the holder for manual operation in reverse directions.

FRED A. FORSBERG.